(12) United States Patent
Lahiri (10) Patent No.: US 7,844,468 B2
(45) Date of Patent: Nov. 30, 2010

(54) SECOND SITE CONTROL OF ARTICLE TRANSPORT PROCESSING

(75) Inventor: Sandip Lahiri, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 2838 days.

(21) Appl. No.: 10/427,128

(22) Filed: Apr. 30, 2003

(65) Prior Publication Data

US 2004/0220818 A1 Nov. 4, 2004

(51) Int. Cl.
G06Q 10/00 (2006.01)
G01N 23/04 (2006.01)
G06K 9/00 (2006.01)
H04N 5/232 (2006.01)

(52) U.S. Cl. .......................... 705/1.1; 378/57; 382/101; 382/100; 348/211.99

(58) Field of Classification Search .................... 705/1, 705/1.1; 378/63, 62, 57; 340/568.1; 382/100, 382/101; 348/207.99, 207.1, 207.11, 211.99
See application file for complete search history.

(56) References Cited

U.S. PATENT DOCUMENTS

| | | | | |
|---|---|---|---|---|
| 4,800,506 A | | 1/1989 | Axelrod et al. ............... 364/478 |
| 4,864,142 A | * | 9/1989 | Gomberg ............... 250/390.04 |
| 4,900,905 A | | 2/1990 | Pusic .......................... 235/381 |
| 5,299,116 A | * | 3/1994 | Owens et al. .................. 705/28 |
| 5,838,758 A | * | 11/1998 | Krug et al. ..................... 378/53 |
| 5,974,111 A | * | 10/1999 | Krug et al. ..................... 378/57 |
| 6,061,502 A | | 5/2000 | Ho et al. ....................... 395/114 |
| 6,317,039 B1 | * | 11/2001 | Thomason ................... 340/505 |
| 6,370,222 B1 | * | 4/2002 | Cornick, Jr. ................... 378/57 |
| 6,707,879 B2 | * | 3/2004 | McClelland et al. .......... 378/57 |
| 6,839,403 B1 | * | 1/2005 | Kotowski et al. .............. 378/57 |
| 7,286,634 B2 | * | 10/2007 | Sommer et al. ............... 378/57 |
| 2006/0273257 A1 | * | 12/2006 | Roos et al. ............... 250/358.1 |
| 2006/0274916 A1 | * | 12/2006 | Chan et al. ................... 382/100 |

* cited by examiner

*Primary Examiner*—Igor Borissov
(74) *Attorney, Agent, or Firm*—David A. Mims, Jr.; William Strinberg; Robert V. Wilder (57) ABSTRACT

In accordance with the present invention, there is provided a system and methodology for sorting and/or distributing items and articles being shipped to a receiving party through private and/or commercial delivery systems. Various characteristics of an article being shipped are obtained and assembled in a database. In an exemplary embodiment, the descriptive characteristics of the article are acquired at a first site and the processing and desired disposition of the article is determined at a second site which is physically separate from the first site. The descriptive characteristics of the article being shipped are displayed at the second site and are sufficient to identify the article to a processing individual located at the second site. The processing individual is then enabled to indicate a desired disposal of the article from the second site without being exposed to the physical article located at the first site. In an exemplary embodiment, the descriptive characteristics of the article may include one or more images of the article along with various other descriptive physical characteristics of the article such as the size and weight of the article. In one example, the processing individual is enabled to authorize the opening of an article in which case, descriptive characteristics of the contents of the article are acquired at the first site and displayed to the processing individual at the second site for use in determining an appropriate disposition of the article.

1 Claim, 8 Drawing Sheets

MAIL PIECE INFORMATION 501

| PIECE | 0001 | 0002 | ·········▶ |
|---|---|---|---|
| SIZE | 4X9.5 | 3.5X6.5 | |
| WEIGHT | .5 | .1 | |
| IMAGE FILE | M1.xyz | M2.xyz | |
| RECEIVED | 4-1-03 | 4-1-03 | |
| PROCESSED | 4-1-03 | 4-1-03 | |
| DISPOSED | 4-2-03 | | |
| DISPOSITION | DISCARD | | |
| SENDER | NONE | "BANK" | |

SECOND SITE CONTROL OF ARTICLE TRANSPORT PROCESSING

FIELD OF THE INVENTION

The present invention relates generally to information processing systems and more particularly to a methodology and implementation for enabling improved processing functionality in article sorting systems.

BACKGROUND OF THE INVENTION

In the past, article delivery and receiving systems have been mis-used by individuals to have unsolicited articles, items and packages delivered to people and/or organizations. Such practices have become widespread for delivering unsolicited marketing materials including advertisements and promotions, for products being offered for sale. The very nature of mail has allowed mass mailings of unsolicited commercial materials including low-interest, "pre-approved" credit cards to people who must spend time to collect such materials at the mailbox and then spend time to open, read and dispose of such materials. The destruction of unwanted materials is essential in many cases in order to avoid the possibility that such "credit cards" can not be mis-used by third parties who may retrieve improperly discarded "credit cards".

Another disadvantage of the mail system is that an individual cannot access the mail addressed to the individual if the individual is away from the receiving mailbox because the review of incoming mail necessarily involves the receipt, opening, and appropriate disposition, all of which, in the past, have required the physical handling of mailed pieces and articled by the receiving party.

A more serious mis-use of article delivery systems involves the use of delivery systems to deliver dangerous materials to a receiving party. In most cases, the receiving party is unaware of the potential danger of opening the received item or article until it is too late and the received item or article has already been opened.

The recent reports of the delivery of dangerous biological materials such as anthrax, using the postal system, has made people in all countries vulnerable to a delivery system which has been trusted for many years. Private and/or commercial article delivery systems are also vulnerable to such mis-uses. Such delivery systems have been used for sending a wide-ranging array of hazardous and potentially life-threatening materials like plastic explosives, poisons, and other biological and chemical materials, to unsuspecting victims and organizations often with fatal and disastrous results.

The above noted vulnerabilities of most current delivery systems have caused many organizations to seek additional inspection systems to further safeguard employees from dangerous items and articles which are shipped between various individuals and/or corporations and/or government organizations. Thus, there is a need for a methodology and system for enabling improved processing of physical items received by an entity from a variety of sources.

SUMMARY OF THE INVENTION

In accordance with the present invention, there is provided a system and methodology for sorting and/or distributing items and articles being shipped. Various characteristics of an article being shipped are obtained and assembled in a database. In an exemplary embodiment, the descriptive characteristics of the article are acquired at a first site and the processing and desired disposition of the article is determined at a second site which is physically separate from the first site. The descriptive characteristics of the article being shipped are displayed at the second site and are sufficient to identify the article to a processing individual located at the second site. The processing individual is then enabled to indicate a desired disposal of the article from the second site without being exposed to the physical article located at the first site. In one example, the processing individual is enabled to authorize the opening of an article in which case, descriptive characteristics of the contents of the article are acquired at the first site and displayed to the processing individual at the second site for use in determining an appropriate disposition of the article.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

It is noted that circuits and devices which are shown in block form in the drawings are generally known to those skilled in the art, and are not specified to any greater extent than that considered necessary as illustrated, for the understanding and appreciation of the underlying concepts of the present invention and in order not to obfuscate or distract from the teachings of the present invention.

The various methods discussed herein may be implemented within any communication device capable of receiving and transmitting electronic signals as herein described, over any interconnection network, including but not limited to the Internet and the World Wide Web. In the present disclosure such devices include, but are not limited to, cellular and other wireless devices, cell phones, so called Digital Personal Assistants or DPAs, laptop and personal computers and also desk top computers connected in local area or wide area networks. The present discussion will be directed to a server-based information processing application although it is understood that the principles involved in the present invention may be applied, inter alia, to all of the above noted receiving and transmitting devices and systems.

The present invention involves separating the physical handling of articles being transported or shipped from the visual inspection of such articles such that the physical placement of articles is accomplished at a first location while the inspection of various characteristics of the article is accomplished at a second location separate from the first location. The physical separation of the first and second locations may be in terms of feet where the second location is in a room adjacent to the physical handling of articles being processed, or in terms of miles where the second location is miles away from the first location and connected only through a wired or wireless network connection. Further, the present invention is applicable to shipped articles including all kinds of envelopes and packages, and the terms "item", "piece", "article" and "package" are used interchangeably to refer to any and all kinds of items capable of being transported from one location to another. Similarly, the terms "remote" and "separate" refer to locations which are distinct from each other regardless of the actual distance involved.

Figure 1:
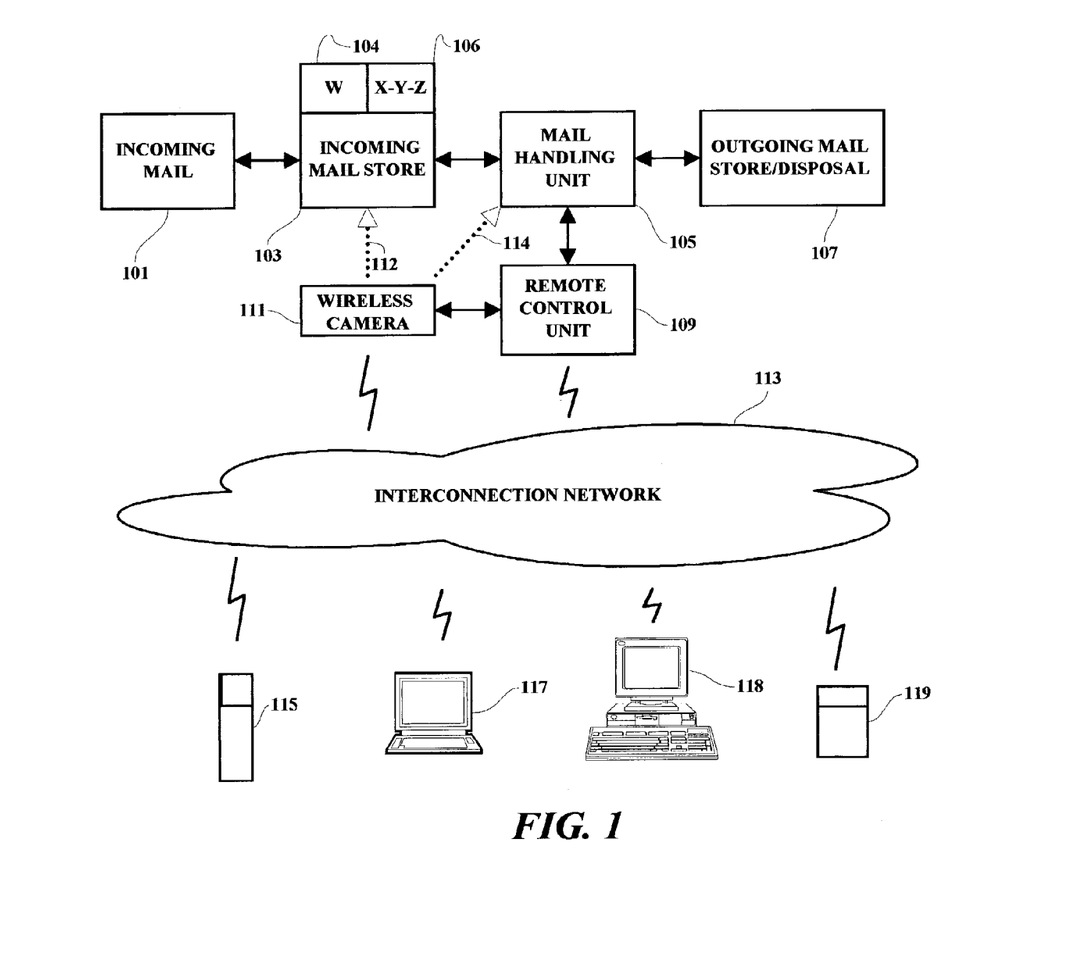
FIG. 1 is a schematic diagram illustrating a system which may be used in an exemplary implementation of the present invention.

In FIG. 1 there is shown an exemplary mail system in which the present invention may be implemented. An incoming incoming mail module 101 capable of receiving incoming mail is coupled to an incoming mail store module 103 which is arranged to store incoming mail items or articles. The incoming mail store module includes a scale device 104 which is used to weigh (W) an article of interest and also a measuring device or system 106 which may be used to obtain the length, width and height (X-Y-Z) dimensions of the article being inspected. Module 103 is further connected to a mail or article handling unit 105 which, in turn, is connected to an outgoing mail store and/or disposal unit 107 and a remote control unit 109. A wireless camera device 111 is physically arranged so as to be able to selectively take pictures 112 of mail items or articles at the incoming mail store unit 103 or to take pictures 114 of such articles at the mail handling unit 105. The wireless camera 111 is capable of taking pictures of articles being transported and converting the pictures or images into digital files in any of various formats. The wireless camera 111 and the remote control unit 109 are also coupled through an interconnection network 113 to any of several available user devices such as a wireless phone 115, a laptop personal computer 117, a desktop personal computer or terminal 118 or a personal digital assistant device (PDA) 119. In accordance with the present invention, the mail or article handling system is located at a first site (illustrated in the drawings above the interconnection network 113) while the user devices are located at a second site separate and distinct from the first site. The actual distance separating the first and second sites may only be a matter of feet separating one possibly explosion-proof or air-tight article handling room from an adjacent viewing room in which a user is enabled to view article characteristics on a display device and initiate article disposition as hereinafter explained in more detail.

Figure 2:
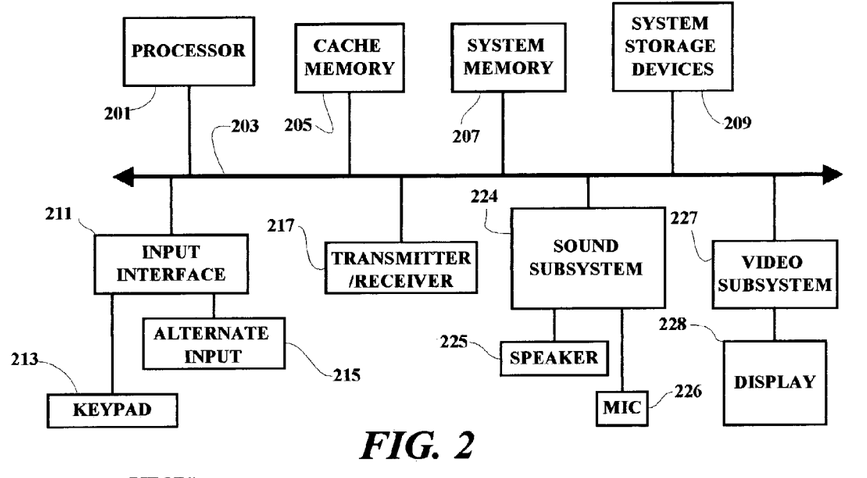
FIG. 2 is a schematic block diagram illustrating several of the major components of an exemplary user terminal connected within the article processing system of the present invention.

Several of the major components of a computerized user device which may be programmed for use in connection with the present invention are illustrated in FIG. 2. A processor circuit 201 is connected to a system bus 203. It is noted that the processing methodology disclosed herein will apply to many different bus and/or network configurations and is not limited to the configuration of the present example. A cache memory device 205 and a system memory unit 207 are also connected to the bus 203. The exemplary system also includes a system storage devices 209. The system bus 203 is also connected through an input interface circuit 211 to a keypad or keyboard 213 as well as alternate input devices 215 which may include voice and/or stylus input devices. The bus 203 is also coupled to a transmitter/receiver section 217 which enables the receipt and transmission of digital information. The illustrated system may also be coupled to a network system through the transmitter/receiver section 217. The exemplary system also includes a sound subsystem 224. Input means such as a microphone 226 and output means such as speaker 225 may also be included to enable a user to communicate with the device using voice commands and voiced menu and message playbacks. A video subsystem 227, which may include a graphics subsystem, is connected between the bus 203 and a display device 228.

Figure 3:
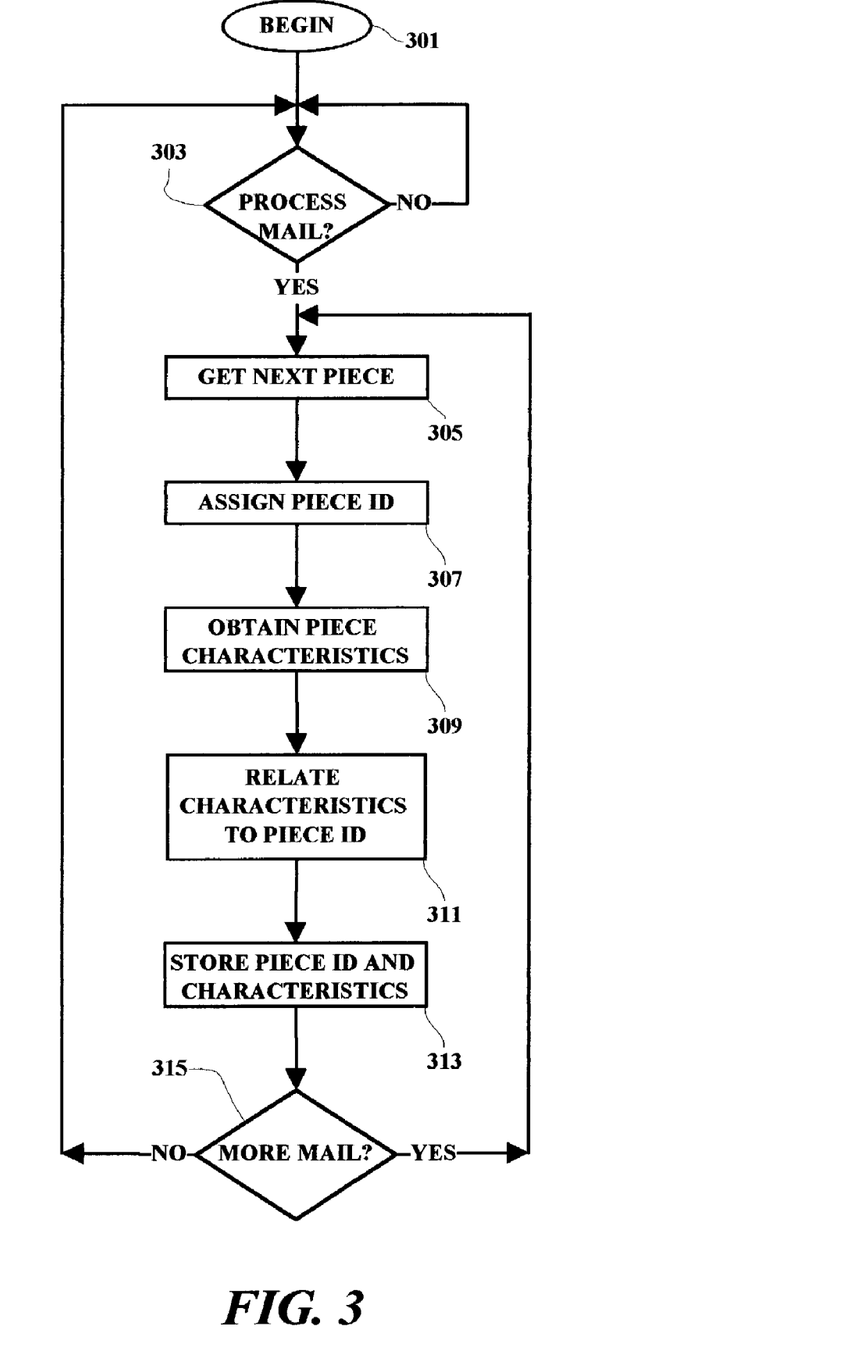
FIG. 3 is a flow chart illustrating a high level functional flow sequence of the present invention.

The overall flow of one aspect of the present invention is illustrated in FIG. 3. The present methodology may be implemented at any point in the transit path of an article being shipped or distributed. Typically, a stream of articles are separated and placed in sequence such that they move into an incoming mail module 101 one article at a time. In the mail store module 103, each article may be placed on a separate tray with slightly raised edges for example to insure that the articles do not get mixed together or overlap. The acquisition of article characteristics process may be initiated by a user at a user terminal or it may be initiated automatically on a periodic basis. As the process begins 301 and a check is made to determine that it is time to process the mail 303, the next article or piece of mail is moved to a location 305 where it can be electronically inspected, i.e. at a position where the article or mail piece can be photographed 112 by the camera 111, weighed by a scale device 104, and measured using, for example, a laser or other optical measuring system 106. The article being inspected is assigned a piece or identification (ID) number 307 and the piece characteristics such as the dimensions, the weight and the image of the article are obtained 309, and the characteristics are then related to the piece ID number 311. The piece ID and related characteristics are then stored 313. The process will continue processing piece-by-piece 315 until there are no more mail pieces to be processed. As a result of this inspection and characteristic acquisition phase, a record is created which identifies each article being received by item number, size and weight, along with one or more image files which may be stored in any of many available image file formats. The article being inspected may be photographed from several different angles to provide several image files in order to obtain as much information as is considered necessary for the particular application.

Figure 4:
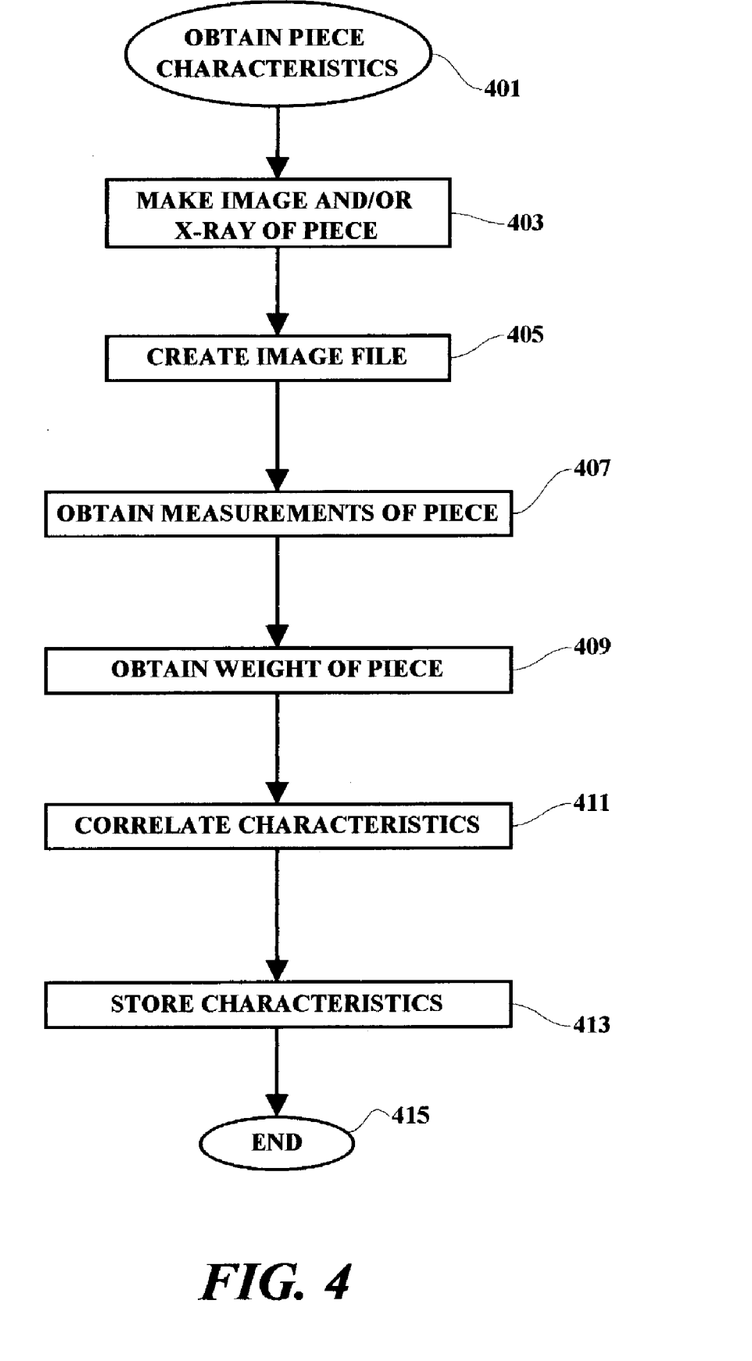
FIG. 4 is a flow chart illustrating an exemplary functional flow sequence used in obtaining predetermined characteristics of articles being shipped in connection with the present invention.

In obtaining the piece characteristics 309, the flow chart illustrated in FIG. 4 may be implemented. When the process begins 401, the piece or article is photographed 403 and an image file is created 405. In some applications, the image obtained may include an X-ray image in addition to or instead of the visual image of the article. It is noted that the characteristics of the article being inspected may be obtained in any order and need not be accomplished in the order shown in the present example. The measurements of the article, including the length, the width and the height, are obtained 407 and the article is weighed 409. In many applications, it will be sufficient to obtain only the length and the width of the article although in the preferred embodiment the height or thickness of the article is also obtained. Other perceivable and/or measurable characteristics, such as color, smoothness of surface, etc. may also be obtained or measured and converted into digital information capable of being electronically processed. After the desired characteristics have been obtained, the characteristics are correlated 411 and stored 413 for system and user access, and the inspecting processing is ended 415.

Figure 5:
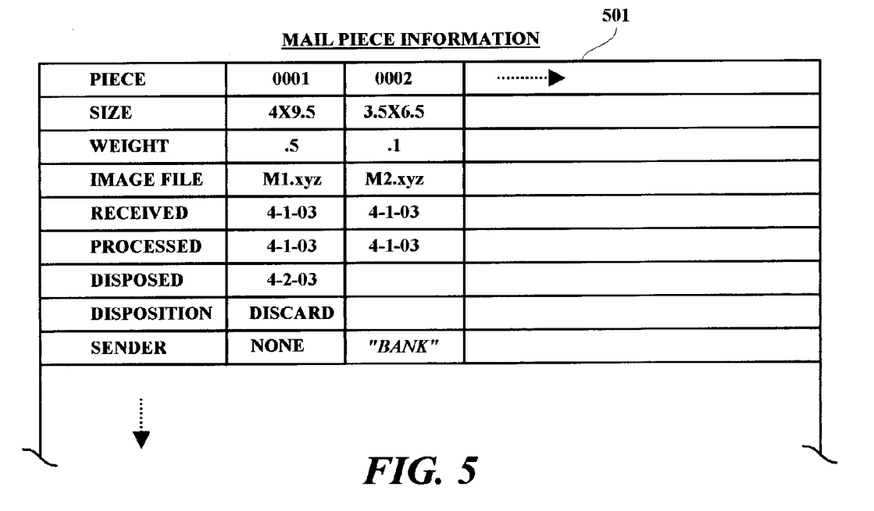
FIG. 5 is an exemplary database which may be used in association with the present invention.

An example of a database format which may be used in storing the characteristics of the articles being inspected is illustrated in FIG. 5. The exemplary format for the mail piece or article information database 501 includes a first row which identifies sequential pieces or articles of mail which have been inspected. Subsequent rows show corresponding characteristics for each piece including size, weight, image file(s), date of receipt of the article, the date the article was inspected and processed, the date that the article was disposed of, the particular disposition of each article and the sender of the article. The database may also include other information concerning the articles being inspected as hereinbefore noted. The sender of the articles may be obtained by scanning the image of the return address section of the article being inspected and either reproducing the return address image in the database space for "Sender" or by translating the return address image to text and inserting the text into the "Sender" space on the database. The database may be viewable by a user on command from a user device and the image files may be called up by the user for display on the user device by pointing and clicking on the "Image File" block which may be designed to contain a hypertext identification of the image file. The system is designed to automatically fill-in the date fields with the appropriate dates on which the corresponding actions have been completed by the system or by the user.

Figure 6:
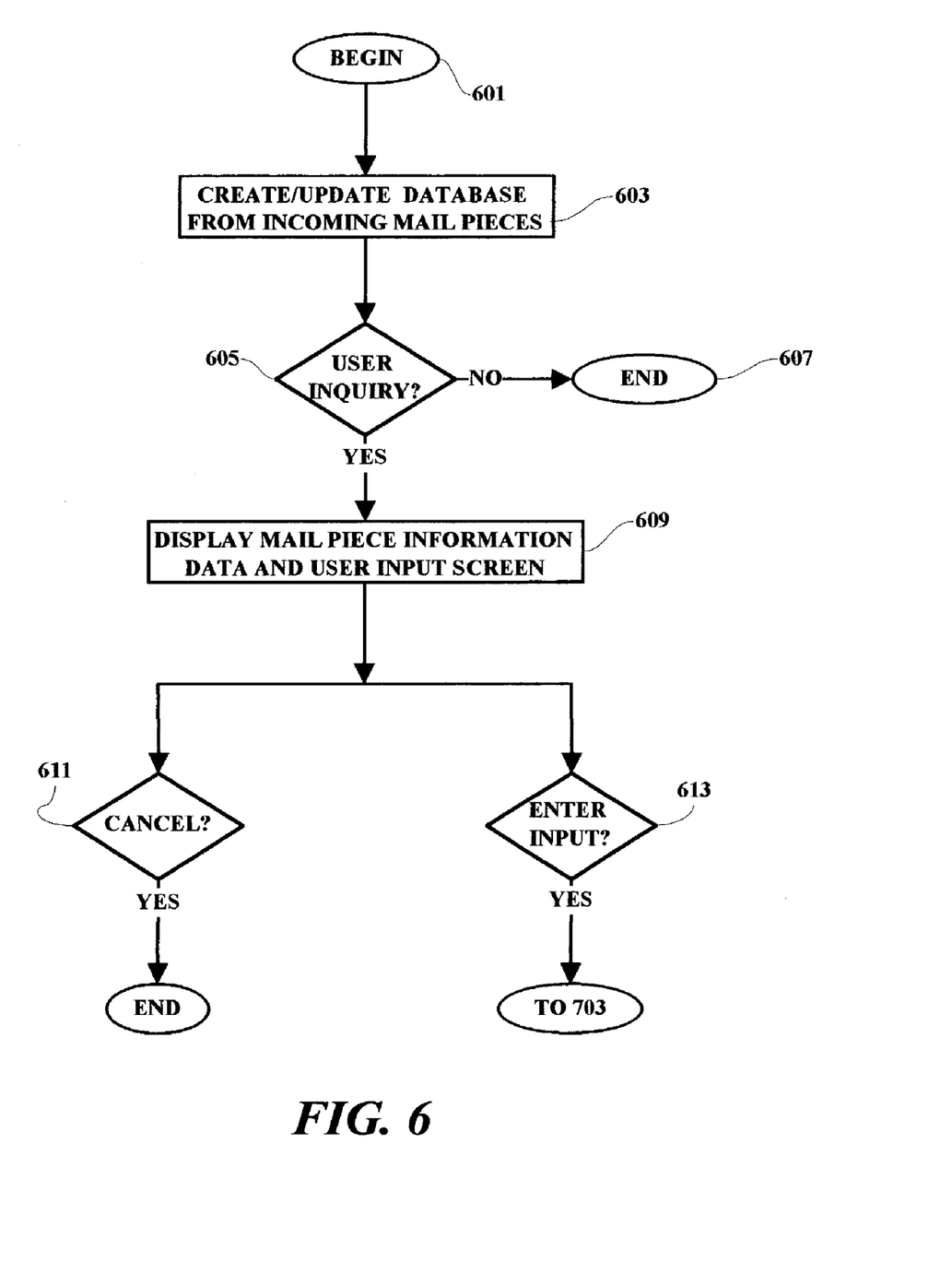
FIG. 6 is a flow chart illustrating an exemplary user interface function in association with the present invention.

FIG. 6 illustrates an exemplary sequential functional flow which may be initiated by a user through a user device. As shown, the process begins 601 by creating and/or updating the database from incoming mail pieces 603. This function may be accomplished periodically as a batch process to log-in mail pieces. A check is made to determine if there is a user request or inquiry 605. If there is no user inquiry, the process may be terminated 607 until the next scheduled updating of the mail piece database. When there is a user inquiry 605 from a second site to review the characteristics of mail pieces logged-in at the first site, an article or mail piece information data and user input screen is displayed 609 on the particular device 115, 117, 118 or 119 being used by the user. The format of the user input screen is shown in FIG. 8.

Figure 8:
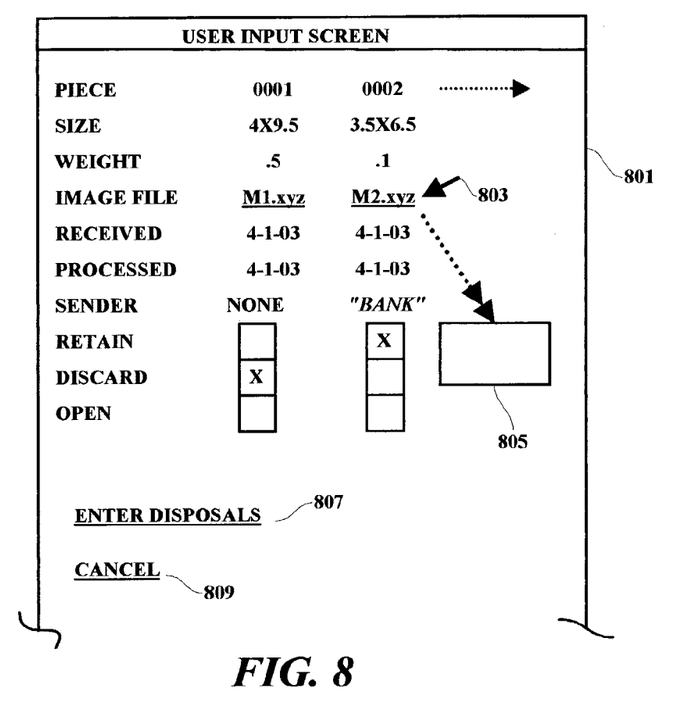
FIG. 8 is an illustration of an exemplary user screen display which may be implemented in connection with the present invention.
Figure 9:
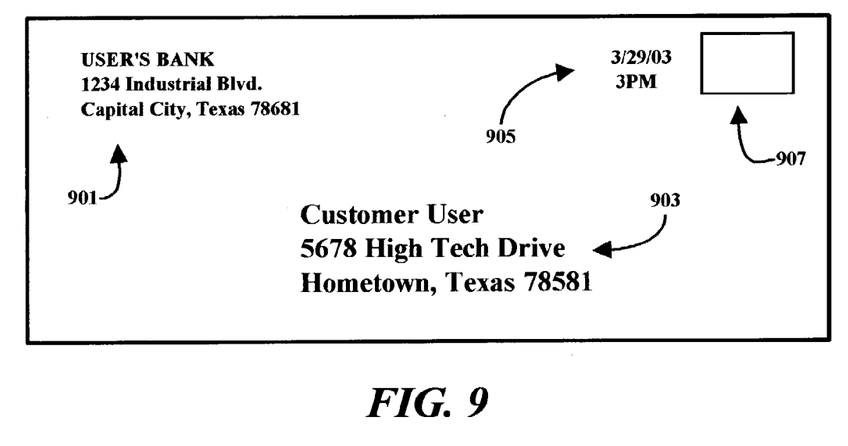
FIG. 9 is an illustration of a mail piece which may be processed in accordance with the present invention.

As shown in FIG. 8, the user input screen 801 displays to the user all of the obtained characteristics for one or more pieces (0001, 0002, etc.) of received mail. In the illustrated example, the user is enabled to point and click 803 on the image file hypertext and a window 805 will appear showing the image of the article being considered for disposal by the user. For example, as shown in FIG. 9, an envelope image may be reproduced within the window 805 which shows various portions of the envelope. The image processing may include typical enhancements to allow a user to enlarge the entire image or only selected portions of the image. These enhanced functions, which are enabled by taking the pictures of the articles as they are being inspected, are extremely valuable where hazardous items are suspected since very close-up views of portions of mailed items may be viewed by a user in a safe location separate from a location where the articles are being physically handled. As shown, the various areas of a mailed envelope include a return address area 901, an addressee area 903, a date stamp area 905 and a postage area 907. Any of these areas may be magnified and inspected in detail by viewing a display screen removed from the mailed item. The user input screen 801 further includes additional information acquired from the inspection of the article and enables the user to provide input with regard to the disposition of the article based upon the observations of the user. For example, after reviewing the characteristics of the article as presented on the user input screen 801, the user is enabled to retain, discard or open the article being considered by checking the corresponding block and clicking on the "ENTER DISPOSALS" hypertext 807. Alternatively, the user may cancel the processing by clicking on the "CANCEL" hypertext 809.

Figure 7:
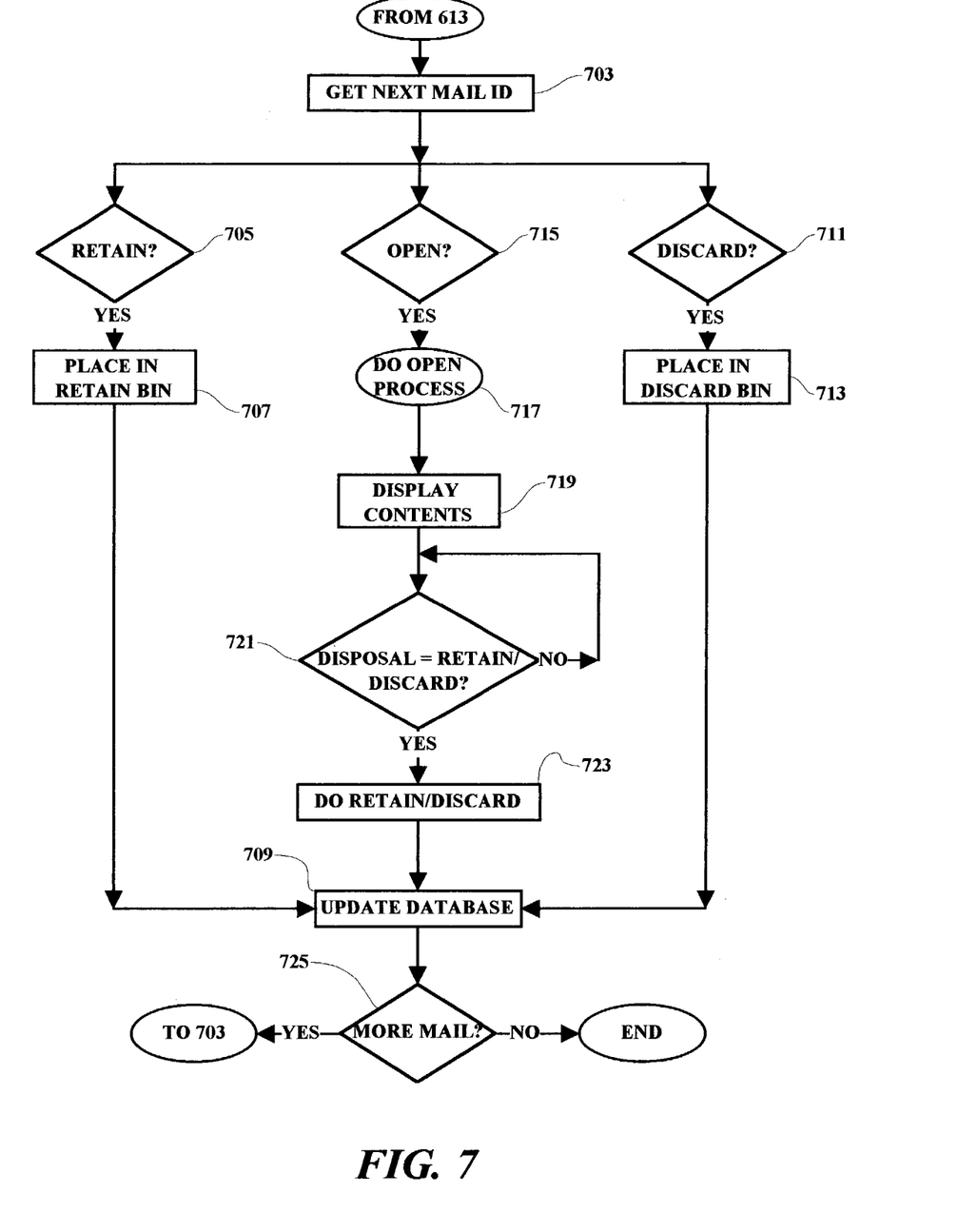
FIG. 7 is a flowchart illustrating an exemplary functional flow sequence in processing articles being shipped in connection with the present invention.

Referring again to FIG. 7, after the user has selected to enter the chosen disposals for the articles being considered, the processing determines which selections were made by the user, i.e. for each item 703, whether to retain 705, open 715 or discard 711. If the user selected to retain an article 705, the article is marked for retention and placed in a retention bin 707, the database is updated 709 to reflect the disposal and the user input screen is checked 725 for more mail disposals. When there are no more mail disposals designated by the user on the user input screen 801, the processing is ended, otherwise the processing continues by getting the next mail ID designated for disposition by the user.

Figure 10:
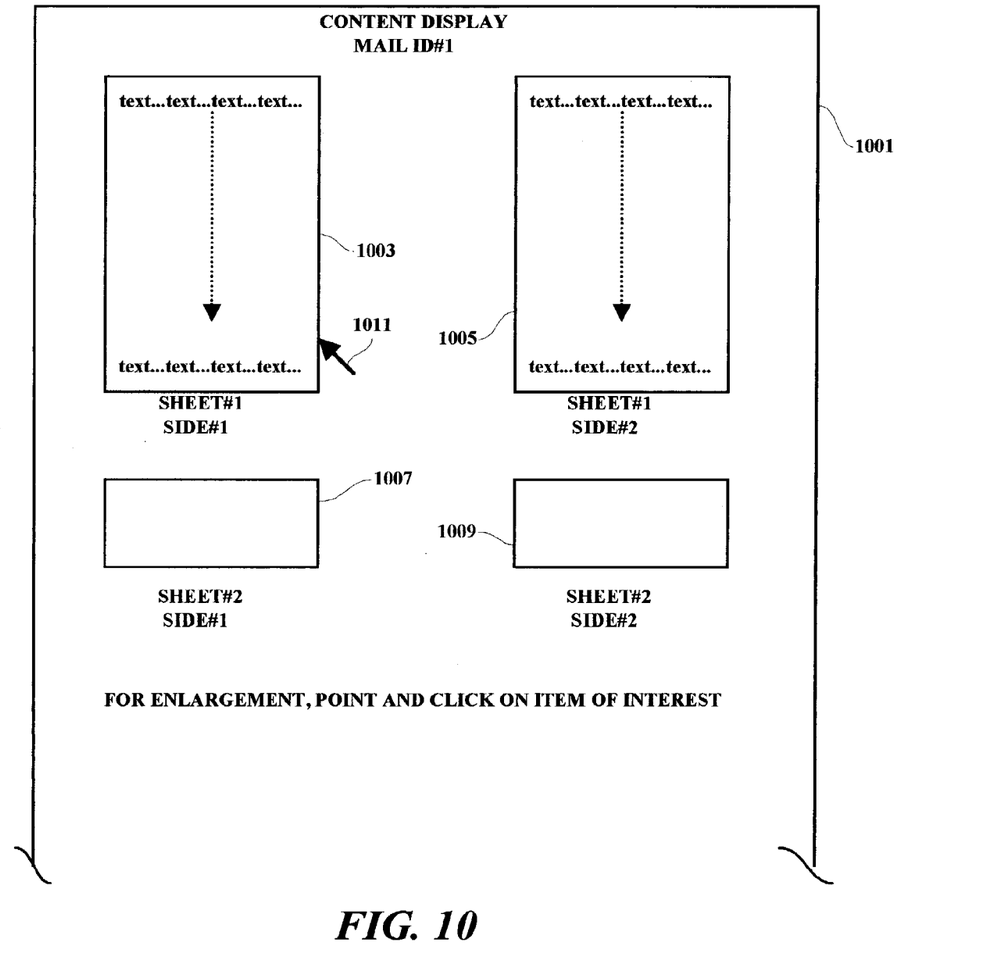
FIG. 10 is an illustration of an exemplary screen display which may be used in displaying contents of an article being processed in accordance with the present invention.

If, for any mail item the user has selected the "OPEN" command 715, the system will run an "OPEN" process 717 in which the particular mail item will be opened at the first site. This opening function may be done either on a contemporaneous basis or on a delayed batch process basis. The opening process includes the opening of the designated mail piece and the inspecting of each sheet or element within the opened article. The inspecting process for the elements inside the mailed article may be the same as that for the article itself, i.e. weight, size, image, etc., but may be comprised of only taking a photograph of the contents, from both sides of each element contained in the mailed piece. In the present example, only images of the contents are obtained. The images of the contents are then displayed 719 to the user and the user is enabled to input a desired disposal 721 for the item being considered. The display of the contents of an article may be presented to the user as shown in FIG. 9 where an image of both sides 1003 and 1005 of each sheet are presented on a content display screen 1001. The presented images will show text and/or handwriting which can be enlarged through the use of a pointer 1011 and reviewed in great detail for investigative purposes. Both sides 1007 and 1009 of other elements in the mail piece being opened such as unmarked packages containing unknown substances, are also displayed for user review and disposition. When the item or article being considered is disposed of in accordance with the user input 723, the database is updated 709 with the disposal information and the user input information is again check for additional disposals 725.

When the user designates the "DISCARD" option on the user input screen 801, the article being considered is moved to a discard bin 713 for appropriate disposal in accordance with a predetermined default protocol. The database is then updated with the disposal information 709 and when there are no more disposals indicated by the user on the user input screen 801 the process is ended. Appropriate predetermined disposals include trashing, shredding or burning designated articles. Articles designated for the retention bin 707 may be held for physical inspection and/or use as evidence by appropriate authorities.

The method and apparatus of the present invention has been described in connection with a preferred embodiment as disclosed herein. The disclosed methodology may be implemented in a wide range of sequences, menus and screen designs to accomplish the desired results as herein illustrated. Although an exemplary embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored in a portable or fixed memory device, such as so-called "Flash" memory, from which it may be loaded into other memory devices and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing an article being transported at a first location by a user located at a second location, said first location being isolated from said second location, said method comprising:

obtaining characteristics descriptive of said article at said first location;
   creating an electronic file containing said characteristics;
   transmitting said electronic file from said first location to said second location;
   processing at said electronic file at said second location to determine said characteristics of said article;
   displaying said characteristics to said user at said second location;
   enabling said user to provide article disposal input information at said second location;
   transmitting said article disposal input information from said second location to said first location; and
   disposing of said article at said first location in accordance with said article disposal input information provided by said user wherein said article is a container being shipped in an article delivery system, wherein said first location is isolated from said second location by being physically remote from said second location, said second location being electronically coupled to said first location by means of an Internet connection, wherein said characteristics include a visually perceptible image of said article, wherein said image is obtained at said first location, said method further including creating an image file from said image at said first location and transmitting said image file from said first location to said second location, said method further including converting said image file for display on a display device at said second location and displaying said image to said user at said second location, wherein said characteristics include weight characteristics representative of weight of said article, wherein said weight is obtained at said first location, said method further including creating a weight information file representative of said weight of said article and transmitting said weight information file from said first location to said second location, said method further including converting said weight information file for display of said weight information on a display device at said second location and displaying said weight information to said user at said second location, wherein said characteristics include dimension characteristics representative of dimensions of said article, wherein said dimensions are obtained at said first location, said method further including creating a, dimension information file representative of said dimensions of said article and transmitting said dimension information file from said first location to said second location, said method further including converting said dimension information file for display of said dimension information on a display device at said second location and displaying said dimension information to said user at said second location, said method further including enabling said user to input an open command at said second location to open said article at said first location and opening said article in accordance with said open command to access contents of said article at said first location, said method further including obtaining contents characteristics descriptive of contents of said article at said first location and displaying said contents characteristics to said user at said second location wherein said contents characteristics include a perceptible image of said contents, said method further including enabling said user to select one of a plurality of article disposal options, one of which is to destroy the article, after viewing said perceptible image of said contents and thereafter disposing of said article at said first location in accordance with said selected article disposal option made by said user at said second location.

* * * * *